United States Patent [19]

Osano

[11] Patent Number: 5,515,457
[45] Date of Patent: May 7, 1996

[54] APPARATUS AND METHOD FOR INTERPOLATING SAMPLED SIGNALS

[75] Inventor: Yuuichi Osano, Kawasaki, Japan

[73] Assignee: Kikusui Electronics Corporation, Kanagawa, Japan

[21] Appl. No.: 756,055

[22] Filed: Sep. 6, 1991

[30] Foreign Application Priority Data

Sep. 7, 1990 [JP] Japan .................. 2-235840

[51] Int. Cl.⁶ .................................................. G06K 9/36
[52] U.S. Cl. ............................................. 382/300; 358/428
[58] Field of Search ................................ 382/47, 54, 299, 382/300, 254; 340/728; 358/37, 166, 428, 451; 364/723; 348/384, 571

[56] References Cited

U.S. PATENT DOCUMENTS

| | | | |
|---|---|---|---|
| 3,524,978 | 8/1970 | Miura et al. | 235/193 |
| 3,754,236 | 8/1973 | Dotson, Jr. | 364/723 |
| 3,789,203 | 1/1974 | Catherall et al. | 364/723 |
| 3,883,727 | 5/1975 | Stuart et al. | 236/152 |
| 4,031,370 | 6/1977 | Catherall | 235/152 |
| 4,263,593 | 4/1981 | Dagostino et al. | 340/228 |
| 4,528,639 | 7/1985 | Edwards | 364/723 |
| 5,068,816 | 11/1991 | Noetzel | 364/723 |

FOREIGN PATENT DOCUMENTS

| | | |
|---|---|---|
| 44-24544 | 10/1969 | Japan . |
| 44-23677 | 10/1969 | Japan . |
| 54-103383 | 8/1979 | Japan . |
| 57-211563 | 12/1982 | Japan . |

OTHER PUBLICATIONS

"A New Method of Interpolation and Smooth Curve Fitting Based on Local Procedures," by Hirashi Akima; Journal of the Association for Computer Machinery, vol. 19, No. 4, Oct. 1970, pp. 589–602.

"Spline Function in A Personal Computer," Yoshimura et al., Interface, vol. 5, No. 11, Nov. 1, 1979, pp. 93–95.

Primary Examiner—Joseph Mancuso
Attorney, Agent, or Firm—Finnegan, Henderson, Farabow, Garrett & Dunner

[57] ABSTRACT

Sampled points are connected by lines to form a line pattern which may have a steady portion and a suddenly changing portion. Various line patterns are classified into several classes depending on rates of change of slopes of the line patterns. When a line pattern transits from the steady portion to the suddenly changing portion, or vice versa, before or after a sampled point, the differential coefficient of an interpolation curve at the sampling point is made closer to the slope in the steady portion. Sampled signals having sudden transitions can thereby be interpolated without undue fluctuations before and after the transitions.

13 Claims, 8 Drawing Sheets

CLASS 1

$$t_0 = \frac{y_{-2} - 6y_{-1} + 3y_0 + 2y_1}{6}$$

$$= \frac{-m_1 + 5m_2 + 2m_3}{6}$$

CLASS 2

$$t_0 = \frac{-2y_{-1} - 3y_0 + 6y_1 - y_2}{6}$$

$$= \frac{2m_2 + 5m_3 - m_4}{6}$$

APPARATUS AND METHOD FOR INTERPOLATING SAMPLED SIGNALS

BACKGROUND OF THE INVENTION

1. Field of the Invention

The present invention relates to an apparatus and method for interpolating sampled signals in which an input signal is sampled and then reproduced to form an output signal using spline interpolation.

2. Background Information

Conventional digital storage oscilloscopes, data recorders, or the like are known to include some form of interpolation apparatus to reproduce an input signal from samples of the input signal.

For example, when a sampled input signal is to be enlarged along the time axis in these apparatus, interpolation data is calculated and inserted between sampled data so that the interpolation data and sampled data can be displayed on a display unit such as a CRT display unit. In such conventional apparatus, linear interpolation, sine interpolation or spline interpolation is used to produce the interpolation data.

Conventional spline interpolation produces a spline curve connecting sampled points. A cubic or third power function curve is commonly used as the spline curve because of processing speed. In this case, a cubic curve that passes two adjacent sampled points is determined, and then a plurality of such cubic curves thus determined are connected to form a spline curve.

Coefficients of the cubic curve that passes two sampled points are determined on the basis of four types of information: sampled data of the two adjacent sampled points and two differential coefficients which satisfy the cubic curve at the two sampled points.

The sampled data of the two sampled points are given already when the sampling of the points is completed, and the differential coefficients at the two sampled points can be obtained as follows:

First, the following five sampled points are selected: a sampled point at which the differential coefficient is to be calculated (central sampled point); two sampled points preceding the central sampled point; and two sampled points following the central sampled point. Second, a biquadratic curve that passes the five sampled points is determined on the basis of the sampled data of these five points. Next, the differential coefficient of the biquadratic curve is calculated at the central sampled point in question, thus determining the differential coefficient at this sampled point. More specifically, a differential coefficient $t_0$ at the central sampled point is given by the following equation when the y coordinates (i.e., sampled data) of the five sampled points are $y_{-2}$, $y_{-1}$, $y_0$, $y_1$ and $y_2$:

$$t_0 = \frac{y_{-2} - 8y_{-1} + 8y_1 - y_2}{12} \quad (1)$$

Likewise, various differential coefficients at different sampled points can be determined.

By using the differential coefficients thus determined and the sampled data of two adjacent sampled points, a cubic curve that interpolates the two adjacent sampled points can be obtained. By sequentially connecting a plurality of these cubic curves a conventional spline curve is obtained.

When an input signal to be enlarged is inputted, the desired number of interpolation data is first determined according to a magnification factor of the time base enlargement between sampled points. The required interpolation data between each two adjacent sampled points is obtained by using the cubic curves forming the spline curve. Then the interpolation data thus obtained are outputted as display data together with the sampled data of the sampled points.

The conventional apparatus using a spline curve can produce good reproduced signals when the input signal to be sampled changes smoothly.

Electric signals to be displayed on a digital storage oscilloscope, however, include various types of step-like transitions, such as those of pulses. The resultant signals produced from such input signals using conventional apparatus have "undulations" before and after the step-like transitions as illustrated by [1]–[8] in FIG. 1. This presents a problem in that the portions of the reproduced signals corresponding to the steady portions before and after the step-like transition of the input signal are unnaturally variable.

SUMMARY OF THE INVENTION

It is therefore an object of the present invention to provide an apparatus and method for interpolating sampled signals from an input signal that can greatly reduce "undulations" before and after step-like transitions of the reproduced signal corresponding to step-like transitions.

In order to accomplish the object of the present invention, there is provided:

an apparatus for interpolating sampled signals, comprising:

an apparatus and related program for sampling an input signal at sampled points to obtain corresponding sampled data representative of the input signal;

an apparatus and related program for interpolating between the sampled data to output interpolation data, the apparatus and related program for interpolating including:

an apparatus and related program for determining the rate of change of sampled data between each adjacent pair of sampled points;

an apparatus and related program for classifying each of selected ones of the sampled points into a plurality of predetermined classes according to the transition behavior of the sampled data before and after the selected sampled points, the transition behavior including: (1) a transition from a steady condition to a suddenly changing condition, or (2) a transition from the suddenly changing condition to the steady condition, or (3) a behavior other than (1) or (2), the steady condition being defined as a portion of the sampled data in which the rates of change are smaller than a first predetermined threshold, and the suddenly changing condition being defined as a portion of the sampled data in which at least one of the rates of change are larger than a second predetermined threshold;

an apparatus and related program for calculating differential coefficients at a pair of sampled points in accordance with predetermined equations each of which is associated with one of the plurality of predetermined classes to which those sampled points belongs;

an apparatus and related program for determining an interpolation curve between the sampled points as a function of the sampled data at the pair of sampled points and the differential coefficients at the pair of sampled points; and an apparatus and related program for generating interpolation data as display data between the pair of sampled points in accordance with the interpolation curve.

Accordingly, when a step-like transition occurs in an input signal, the slope of the line pattern formed by connecting the sampled points changes across the step-like transition. In such a case, the circuit for calculating differential coefficients changes the process for calculating differential coefficients according to the predetermined line pattern, so that the differential coefficients at the sampling points in the steady portion becomes closer to the rate of change on the steady portion side of the transition. This reduces the "undulations" of the reproduced signal which otherwise would occur in the steady portions before and after the step-like transitions of the input signal.

The above and other objects, effects, features and advantages of the present invention will become more apparent from the following description of the embodiment thereof taken in conjunction with the accompanying drawings.

DETAILED DESCRIPTION OF PREFERRED EMBODIMENTS

The present invention will now be explained with reference to the accompanying drawings.

First, the process of determining differential coefficients or coefficients for slopes at various sampled points in an embodiment of the present invention will be explained.

Figure 2:
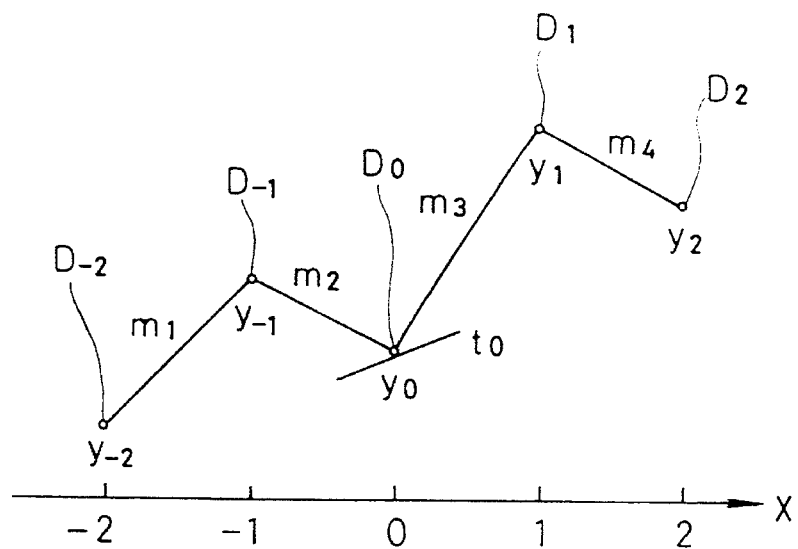
FIG. 2 is an explanatory diagram illustrating an example of a determination process of a differential coefficient $t_0$ at a sampled point $D_0$ in accordance with the present invention.

FIG. 2 illustrates sampled data $y_{-2}$, $y_{-1}$, $y_0$, $y_1$ and $y_2$ obtained by sampling an input signal at sampled points $D_{-2}$, $D_{-1}$, $D_0$, $D_1$ and $D_2$ respectively. $|m_1|$, $|m_2|$, $|m_3|$ and $|m_4|$ denote the absolute values of slopes of lines connecting the sampled points. $t_0$ indicates the differential coefficient at the sampled point $D_0$.

Figure 3A:
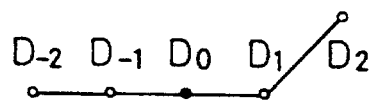
FIGS. 3A and 3B are explanatory diagrams illustrating examples of line patterns and equations for determining differential coefficients of the line patterns in Classes 1 and 2 and in Class 3, respectively.
Figure 3A:
Figure 3A:
Figure 3A:
Figure 3A:
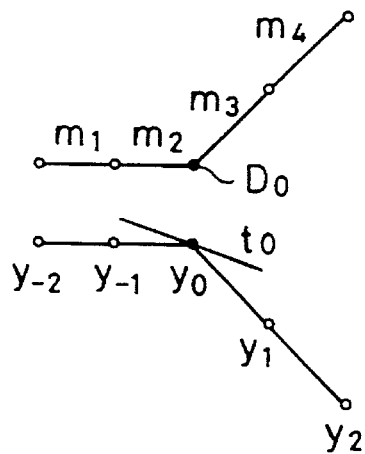
Figure 3A:
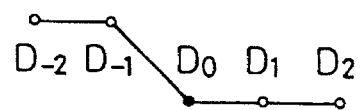
Figure 3A:
Figure 3A:
Figure 3A:
Figure 3A:
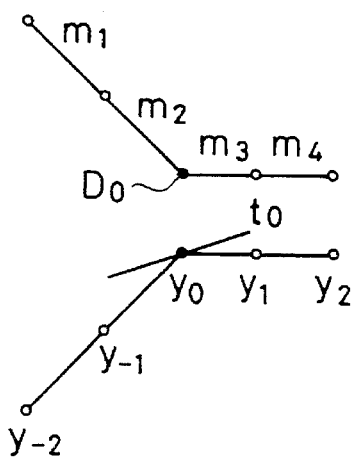
Figure 3B:
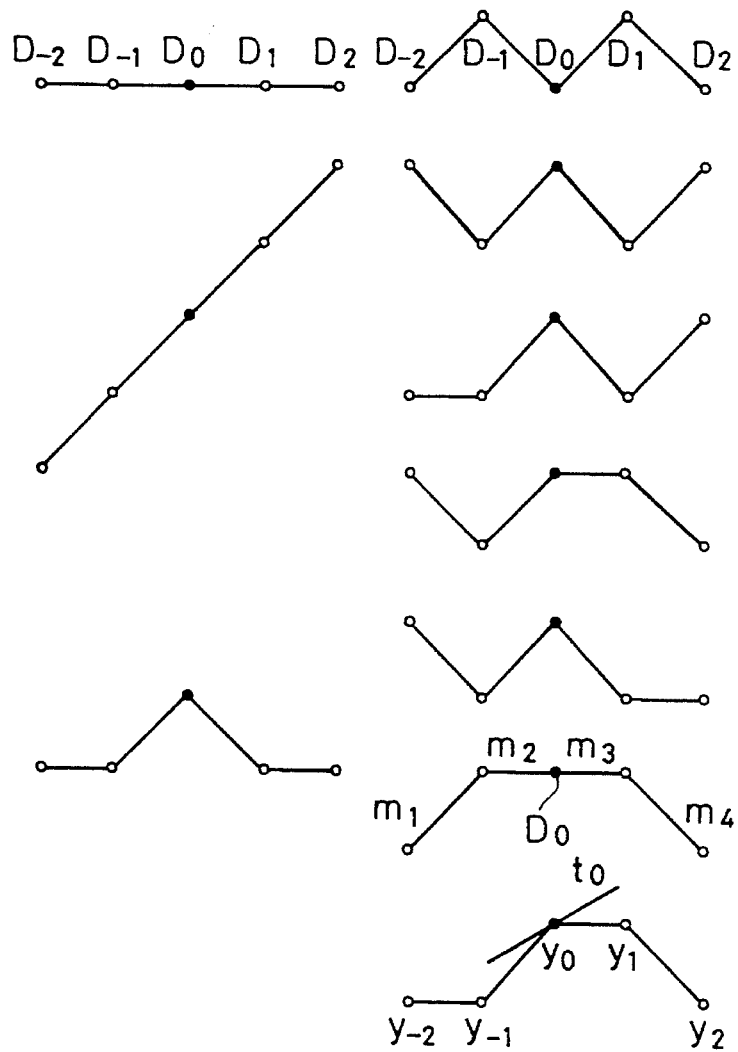

In the case of determining the differential coefficient $t_0$ at the sampled point $D_0$, the slopes $|m_1|$ through $|m_4|$ are classified into three Classes 1, 2, and 3 according to the absolute values of the slopes $m_1$ through $m_4$ as shown in FIGS. 3A and 3B, and TABLE 1 below.

FIGS. 3A and 3B are explanatory diagrams showing examples of line patterns, and equations for determining the differential coefficients at sequentially sampled points in accordance with the line patterns obtained by connecting the sequentially sampled points. In FIGS. 3A and 3B, solid circles indicate sampled points $D_0$ at which differential coefficients should be obtained.

TABLE 1

|         | $|m_1|$ | $|m_2|$ | $|m_3|$ | $|m_4|$ |
|---------|---------|---------|---------|---------|
| CLASS 1 | small   | small   | small   | large   |
|         |         |         | large   | small   |
|         |         |         | large   | large   |
| CLASS 2 | small   | large   | small   | small   |
|         | large   | small   |         |         |
|         | large   | large   |         |         |
| CLASS 3 | the remaining combinations | | | |

In this TABLE 1, three Classes 1, 2 and 3 are specified as follows:

CLASS 1

An input signal is in a steady state before the sampled point $D_0$ at which a differential coefficient is to be obtained, and suddenly changes after the sampled point $D_0$.

CLASS 2

Class 2 is opposite to Class 1. An input suddenly signal changes before the sampled point $D_0$ and is in a steady state after the sampled point $D_0$.

CLASS 3

Class 3 covers all the remaining behaviors of an input signals as shown in FIG. 3B.

The differential coefficient $t_0$ is determined differentially for each of the respective classes. In Classes 1 and 2, the differential coefficient $t_0$ is determined by a manner different from that of the conventional method, whereas in Class 3 $t_0$ is determined in the same manner as that conventional spline interpolation. The preferred procedure in Class 3 will be described first.

Class 3

In this class the differential coefficient $t_0$ is determined in a conventional manner. That is, five sampled points $D_{-2}$ through $D_2$ are selected as in the conventional method: two sampled points $D_{-2}$ and $D_{-1}$ are selected from the sampled points preceding the sampled point $D_0$ at which the differential coefficient $t_0$ is to be calculated; and two other points $D_1$ and $D_2$ are selected from the sampled points following the sampled point $D_0$. Then, a biquadratic curve that passes the five sampled points $D_{-2}$ through $D_2$ is obtained. The differential coefficient of the biquadratic curve at the sampled point $D_0$ is expressed by the following equation:

$$t_0 = \frac{y_{-2} - 8y_{-1} + 8y_1 - y_2}{12} \quad (2)$$

$$= \frac{-m_1 + 7(m_2 + m_3) - m_4}{12}.$$

As clearly seen from equation (2), this equation is identical to equation (1) used in the conventional method.

CLASS 1

In this class, four sampled points $D_{-2}$, $D_{-1}$, $D_0$, and $D_1$ (not five points as in the conventional method) are selected so-that the differential coefficient $t_0$ at the sampling point $D_0$ becomes closer to a rate of change on the steady condition side before the sampled point $D_0$. That is, two points $D_{-2}$ and $D_{-1}$ are selected from the sampled data points on the side in which the input signal is in a steady condition, and one point $D_1$ is selected from the sampled points on the suddenly changing condition side. Then a cubic curve (not a biquadratic function as in the conventional method) that passes the four sampled points $D_{-2}$, $D_{-1}$, $D_0$ and $D_1$ is calculated. In this case, the differential coefficient $t_0$ of the cubic curve at the sampled point $D_0$ is expressed by the following equation:

$$t_0 = \frac{y_{-2} - 6y_{-1} + 3y_0 + 2y_1}{6} \quad (3)$$

$$= \frac{-m_1 + 5m_2 + 2m_3}{6}.$$

The coefficients for slopes $m_1$, $m_2$, $m_3$ and $m_4$ in equations (2) and (3) can be determined as shown in TABLE 2.

TABLE 2

|  | $m_1$ | $m_2$ | $m_3$ | $m_4$ |
|---|---|---|---|---|
| CLASS 3 | $-\frac{1}{12}$ | $\frac{7}{12}$ | $\frac{7}{12}$ | $-\frac{1}{12}$ |
| CLASS 1 | $-\frac{2}{12}$ | $\frac{10}{12}$ | $\frac{4}{12}$ | 0 |

As shown in TABLE 2, the absolute values of the coefficients for slopes $m_1$ and $m_2$ in the steady condition side are larger in Class 1 than in Class 3, whereas the absolute values of the coefficients for slopes $m_3$ and $m_4$ on the suddenly changing condition side are smaller in Class 1 than in Class 3. In other words, in Class 1, the weights in the steady condition are large, while the weights in the suddenly changing condition are small.

Class 2

In this class, four sampled points $D_{-1}$, $D_0$, $D_1$ and $D_2$ are selected so that the differential coefficient $t_0$ at the sampled point $D_0$ becomes closer to a rate of change in the steady condition after the sampled point $D_0$. That is, one point $D_{-1}$ is selected from the sampled points on the suddenly changing condition side, and the other two points $D_1$ and $D_2$ are selected from the sampled points on the steady condition side. Then, the cubic curve (not a biquadratic curve as in the conventional method) that passes the four sampled points $D_{-1}$, $D_0$, $D_1$ and $D_2$ is calculated. In this case, the differential coefficient $t_0$ of the cubic curve at the sampled point $D_0$ is expressed by the following equation:

$$t_0 = \frac{-2y_{-1} - 3y_0 + 6y_1 - y_2}{6} \quad (4)$$

$$= \frac{2m_2 + 5m_3 - m_4}{6}.$$

The coefficients for slopes $m_1$, $m_2$, $m_3$ and $m_4$ in equations (2) and (4) can be determined as shown in TABLE 3.

TABLE 3

|  | $m_1$ | $m_2$ | $m_3$ | $m_4$ |
|---|---|---|---|---|
| CLASS 3 | $-\frac{1}{12}$ | $\frac{7}{12}$ | $\frac{7}{12}$ | $-\frac{1}{12}$ |
| CLASS 2 | 0 | $\frac{4}{12}$ | $\frac{10}{12}$ | $-\frac{2}{12}$ |

As shown in TABLE 3, the absolute values of the coefficients for the slopes $m_3$ and $m_4$ in the steady condition are larger in Class 2 than in Class 3, whereas the absolute values of the coefficients for the slopes $m_1$ and $m_2$ in the suddenly changing condition are smaller in Class 2 than in Class 3. In other words, in Class 2, the weights in the steady condition are large, while the weights in the suddenly changing condition are small.

In this manner, various differential coefficients at various sampled points are calculated in accordance with the classes.

Figure 4:
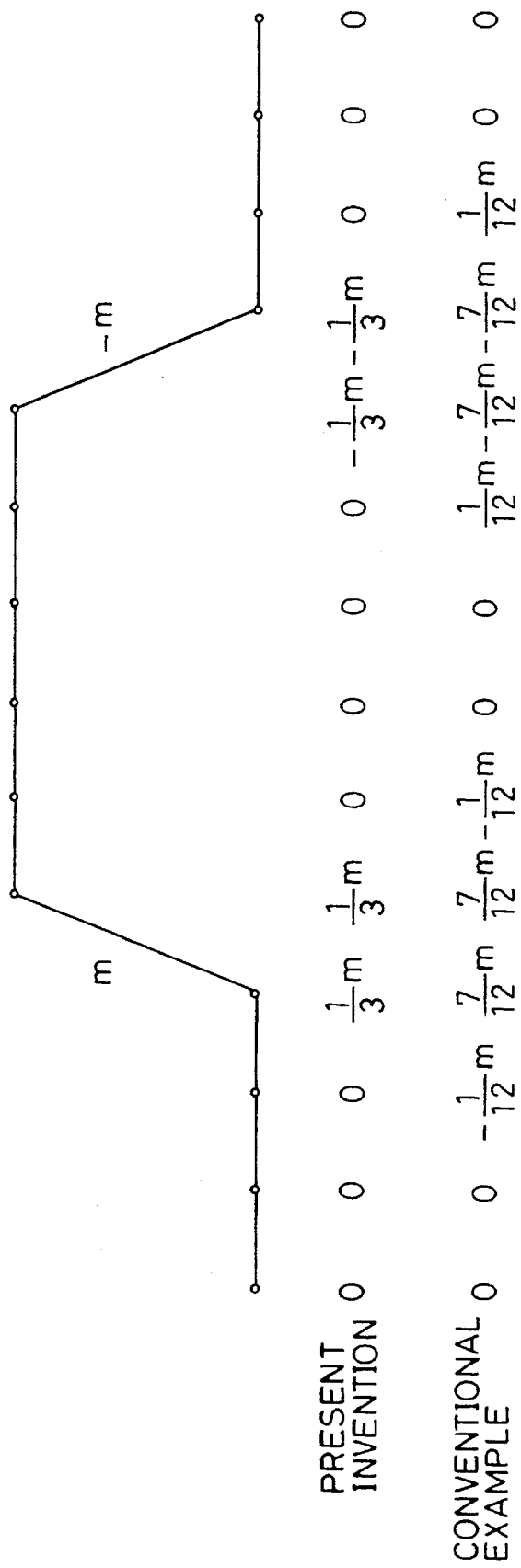
FIG. 4 is an explanatory diagram illustrating the relationship between the line pattern formed by connecting adjacent sampled points and two sets of differential coefficients at the sampled points in the case of the present invention and in the case of the conventional apparatus.

FIG. 4 illustrates a line pattern formed by connecting the sampled data of a pulse-shaped input signal, together with two sets of resultant differential coefficients calculated at the respective sampled points. Here, one of the two sets is obtained by the algorithm of the present invention described above; whereas the other set is, for comparison purposes, obtained by the conventional algorithm in which the same number of sampled points are used for calculating differential coefficients at all sampled points regardless of the classes. Further, in FIG. 4, |m| is specified as a value larger than a predetermined threshold value K.

In the present invention, as clearly seen from FIG. 4, the differential coefficients of the sampled points on the steady condition side become greatly closer to the rate of change in that steady condition.

Next, a cubic curve that interpolates a position between two adjacent sampled points is calculated on the basis of the two sampled data and the two differential coefficients obtained above. This process will be described below.

Figure 5:
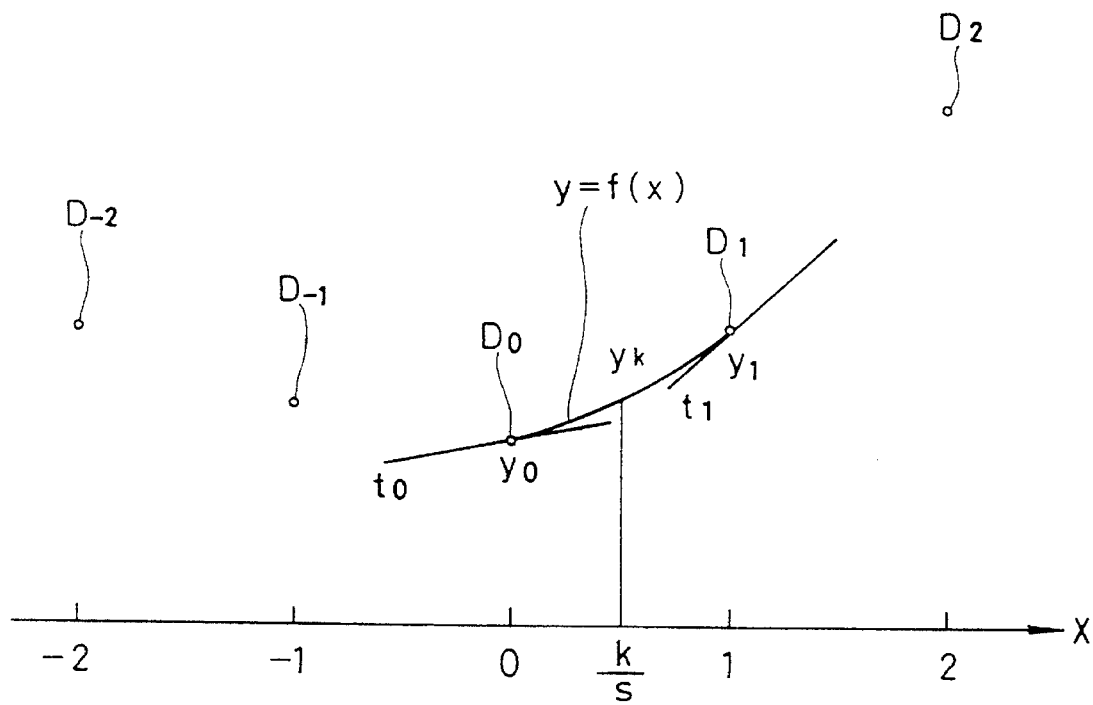
FIG. 5 is an explanatory diagram illustrating an example of interpolation data for interpolating data at the two adjacent sampled points $D_0$ and $D_1$.

First, as shown in FIG. 5, let us assume that a sampled data and a differential coefficient at the sampled point $D_0$ are $y_0$ and $t_0$, respectively, and that a sampled data and a differential coefficient at the sampled point $D_1$ are $y_1$ and $t_1$, respectively. A cubic curve $y=f(x)$ that interpolates a portion between the two sampled points $D_0$ and $D_1$ is expressed as follows:

$$\begin{aligned} y &= P_0 + P_1 x + P_2 x^2 + P_3 x^3 \quad (5) \\ &= P_0 + \{P_1 + (P_2 + P_3 x)x\}x. \end{aligned}$$

The coefficients $P_0$, $P_1$, $P_2$ and $P_3$ are expressed as follows by using the values $y_0$, $t_0$, $y_1$ and $t_1$:

$$P_0 = y_0$$

$$P_1 = t_0$$

$$P_2 = 3(y_1 - y_0) - 2t_0 - t_1 \quad (6)$$

$$P_3 = t_0 + t_1 - 2(y_1 - y_0)$$

Thus, cubic curves for interpolating two adjacent sampled points are successively determined.

Next, an embodiment of a processing procedure for generating interpolating data by using the cubic curves or the interpolation curves thus obtained will be explained.

As an example, a case in which an input signal is magnified 50 times and then outputted together with interpolation data will be explained. In such a case, a time space between the adjacent sampled points $D_0$ and $D_1$ must be divided into 50 sections so that 49 points of interpolation data are expressed as follows:

$$x = k/S,$$

where S is the magnification (=50), and k is the sequential number of points to be interpolated (=1, 2, ..., 49).

A value $y_k$ of each interpolation data between the two sampled points $D_0$ and $D_1$ can be expressed by the following equation by using equation (5)

$$y_k = P_0 + P_1 \tfrac{k}{S} + P_2(\tfrac{k}{S})^2 + P_3(\tfrac{k}{S})^3 \qquad (7)$$

By rewriting the above equation, the following equation can be obtained:

$$y_k = P_0 + \frac{\{12P_1S^2 + (12P_2S + 12P_3k)k\}k}{12S^3} \qquad (8)$$

Here, if the following substitution is made $$P_0 = y_0$$
$$C_1 = 12P_1S^2$$
$$C_2 = 12P_2S \qquad\qquad (9),$$
$$C_3 = 12P_3$$

the following equation is obtained:

$$y_k = y_0 + \frac{\{C_1 + (C_2 + C_3k)k\}k}{12S^3} . \qquad (10)$$

The values $C_1$, $C_2$ and $C_3$ can be expressed as follows by using equation (6):

$$\begin{aligned}
C_1 &= 12P_1S^2 \qquad (11)\\
&= 12t_0S^2\\
C_2 &= 12P_2S\\
&= \{36(y_1 - y_0) - 2 \times 12t_0 - 12t_1\}S\\
C_3 &= 12P_3\\
&= 12t_0 + 12t_1 - 24(y_1 - y_0).
\end{aligned}$$

Using these values $C_1$, $C_2$, and $C_3$ thus selected, the time for calculation can be shortened, because $C_1$, $C_2$ and $C_3$ can be obtained by using $12t_0$ instead of $t_0$, or by using only multiplication without using division.

Figure 6:
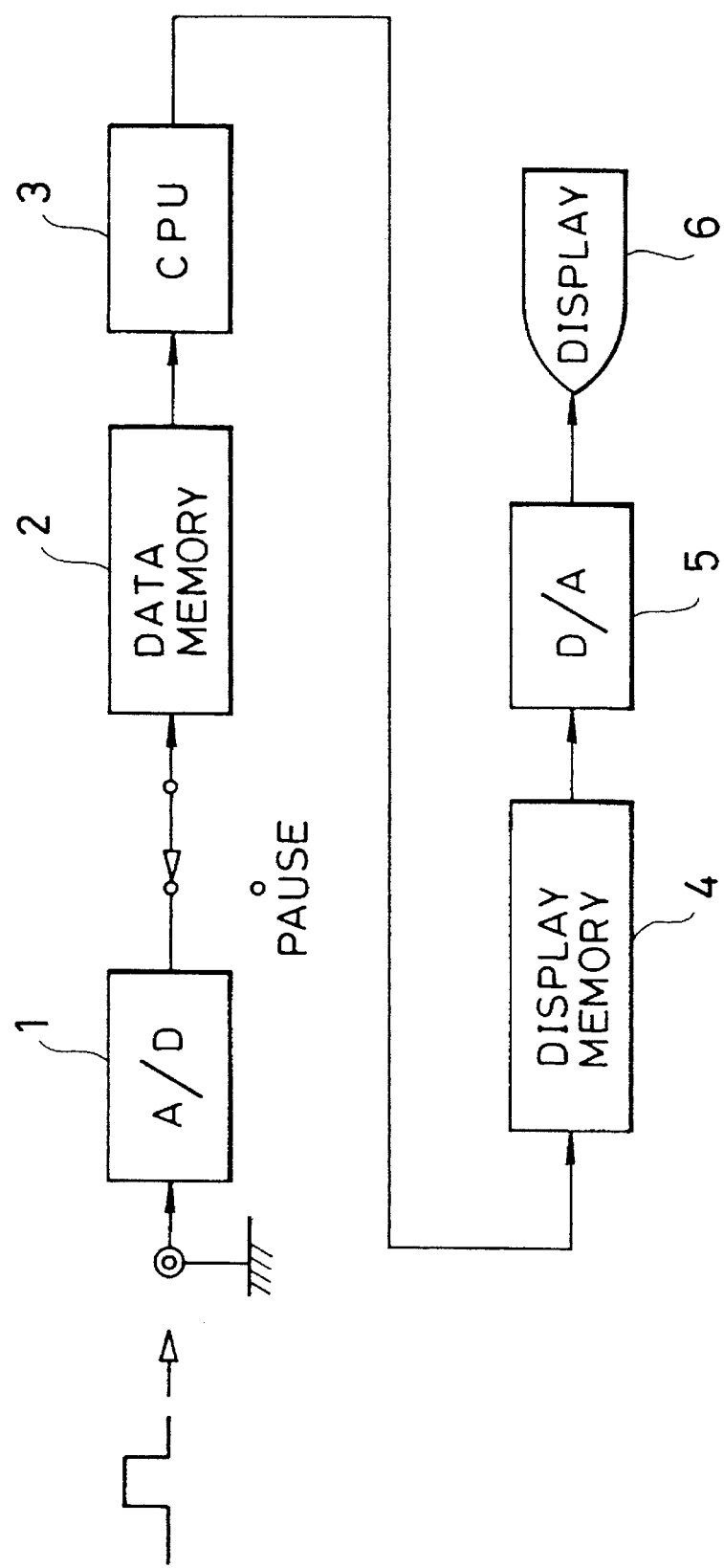
FIG. 6 is a block diagram showing a schematic arrangement of an embodiment of the present invention.

FIG. 6 is a block diagram showing a schematic arrangement of an embodiment of the present invention, in which the digital signal processing of the method described above is performed. In FIG. 6, reference numeral 1 designates an A/D converter for converting the sampled signal into a digital value. Reference numeral 2 denotes a data memory for storing an output from the A/D converter 1. A CPU 3, having an ROM for storing programs described later and an RAM used as a working memory, generates interpolation data after determining interpolation functions for interpolating a portion between two adjacent sampled points, and then outputs the interpolation data together with the sampled data of the sampled points. Reference numeral 4 designates a display memory for storing display data consisting of the sampled data at the sampled points and the interpolation data. Reference numeral 5 denotes a D/A converter for converting the display data read out from the display memory 4 into an analog signal and for outputting the converted data to a display unit 6 such as a CRT or LCD display unit.

Figure 7:
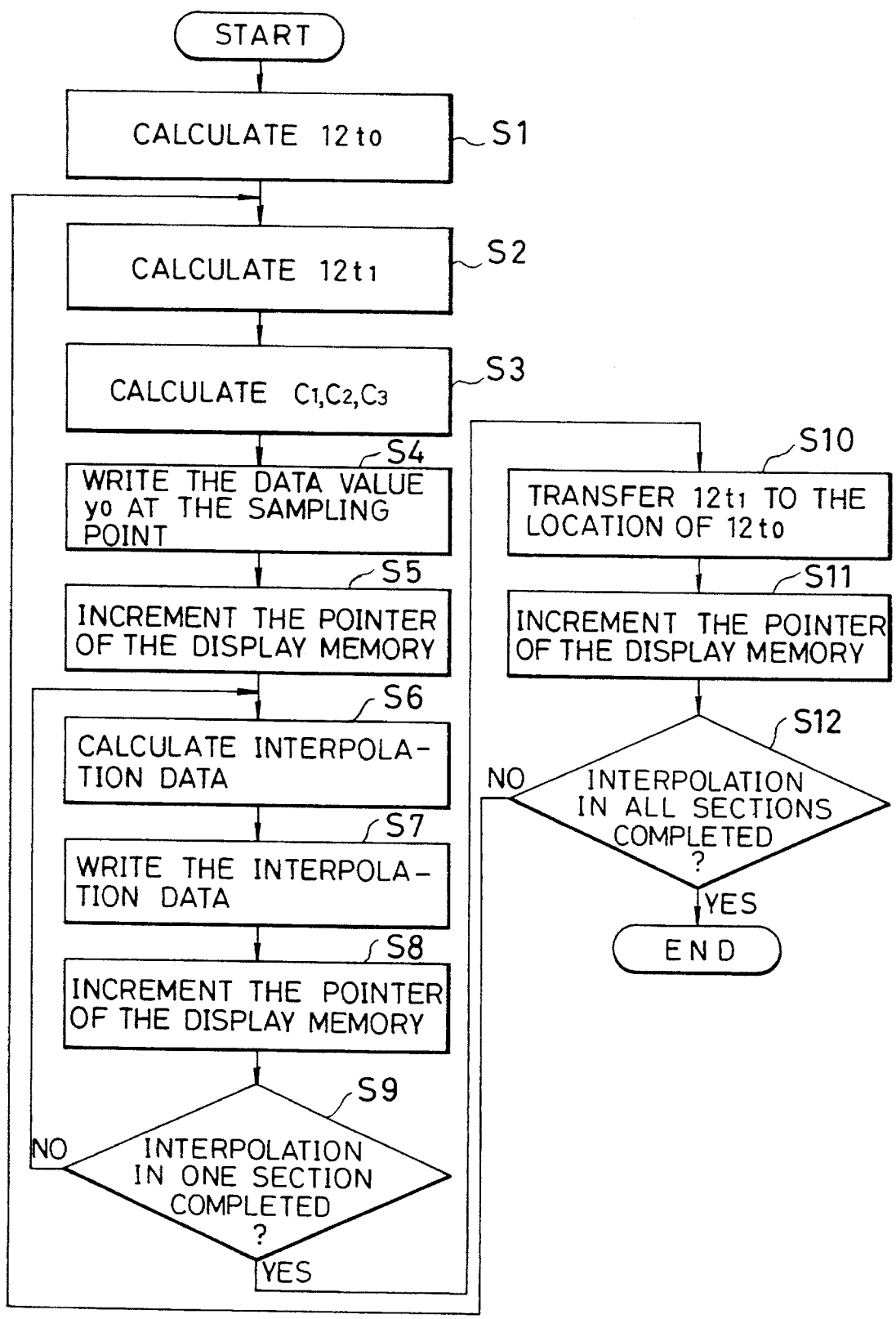
FIG. 7 is a flowchart showing an embodiment of a procedure of a program to be executed by the CPU 3 shown in FIG. 6.
Figure 8:
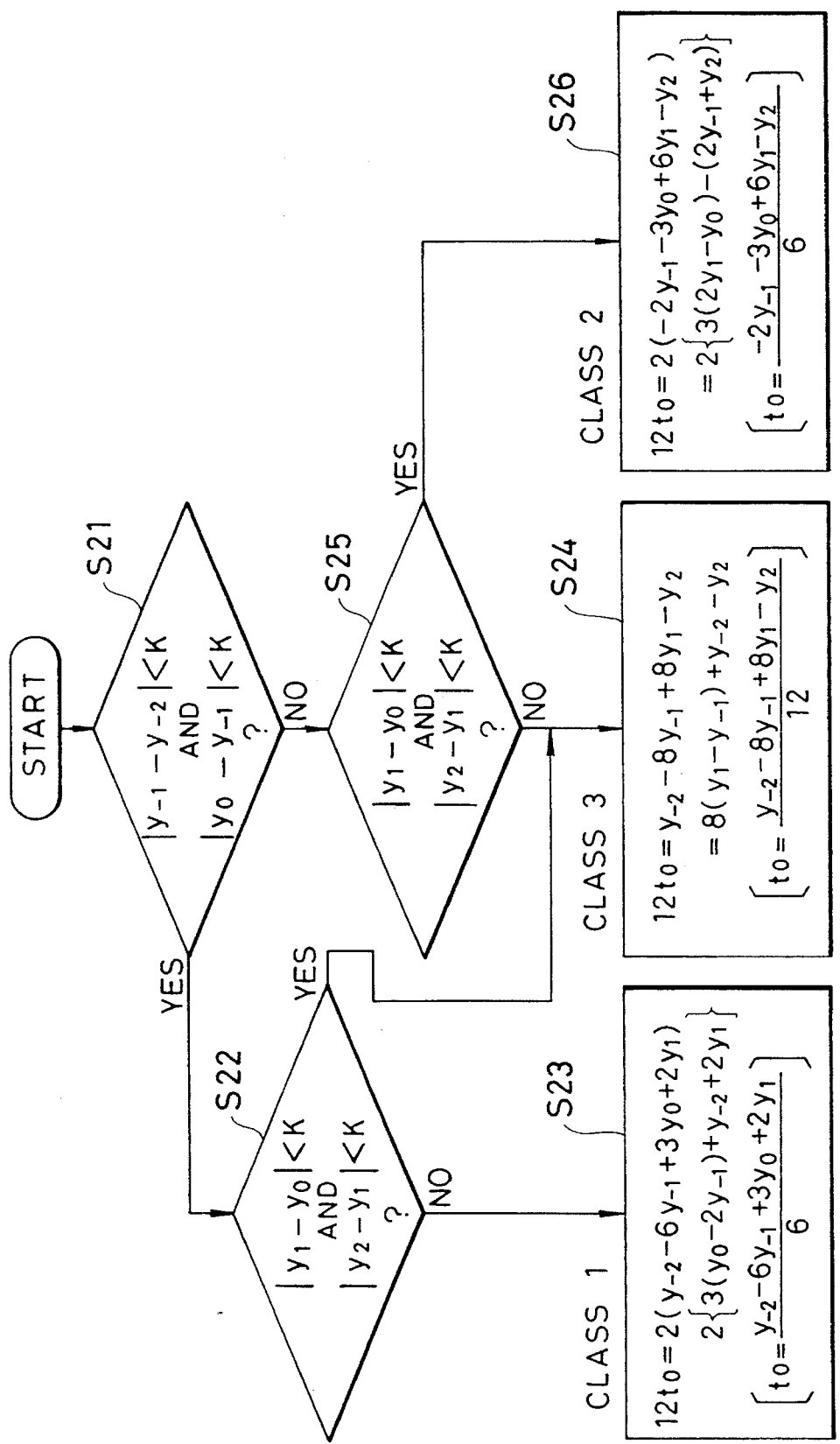
FIG. 8 is a flowchart showing an embodiment of a procedure of a program to be executed to determine differential coefficients at sampled points.

FIGS. 7 and 8 are flowcharts showing an example of the procedure to be executed by the CPU 3. Here, it is assumed that all sampled data at all sampled points are stored in the data memory 2 already and that 49 interpolation data are generated between two adjacent sampled points.

At step S1, the value $12t_0$, or 12 times the differential coefficient $t_0$ at the first sampled point is calculated after determining the class (Class 1-3) to which the first sampled point belongs, and the value is stored in the work memory in the CPU 3.

At step S2, the value $12t_1$, or 12 times the differential coefficient $t_1$ of the second sampled point is calculated, and the value is stored in the work memory.

Next, an algorithm for determining differential coefficients in accordance with the line pattern will be explained.

Since a sampling interval is a predetermined time interval, the slope m of a line connecting two adjacent sampled points corresponds to a difference between sampled data y at the two adjacent sampled points. Accordingly, in the following algorithm, the difference between sampled data y at the two adjacent sampled points is used to classify line patterns.

FIG. 8 is a flowchart showing an algorithm for determining the differential coefficients $t_0$ (or $t_1$) according to line patterns formed by connecting adjacent sampled points.

In FIG. 8, at step S21, sampled point selection and calculation of sampled data (y) differences are determined. That is, sampled point $D_0$ at which a differential coefficient is to be calculated is selected. Then, sampled data $y_0$ of that sampled point $D_0$ is obtained and the sampled data $y_{-1}$ and $y_{-2}$ of the preceding two sampled points $D_{-1}$ and $D_{-2}$ are also obtained. The absolute difference values $|y_{-1} - y_{-2}|$ and $|y_0 - y_{-1}|$ of the y sampled data of the adjacent sampled points are calculated and then these absolute values are compared with a predetermined threshold K. When both the two absolute values are less than the predetermined threshold K, the procedure proceeds to step S22.

The predetermined threshold K is set according to the type of signal to be processed by the apparatus. For example, when the sampled data values y to be processed ranges within 0-225, K may be set at about 10.

At step S22, processing similar to that at step S21 is carried out with regard to two sampled points $D_1$ and $D_2$ following the sampled point $D_0$ at which a differential coefficient is to be obtained. That is, the sampled data $y_1$, $y_2$ of the following two sampled points $D_1$ and $D_2$ are obtained. The absolute difference values $|y_1 - y_0|$ and $|y_2 - y_1|$ of the sampled data of the adjacent sampled points are calculated. Then, these absolute values are compared with the predetermined threshold K. When at least one of the two absolute values is larger than the predetermined threshold K, the procedure proceeds to step S23 to calculate the differential coefficient $t_0$ in Class 1.

When, at step S22, both the two absolute values are less than the predetermined threshold K, the procedure proceeds to step S24 where the differential coefficient $t_0$ in Class 3 is calculated. As described before in Class 3, the differential coefficient $t_0$ is calculated in the same manner as that of the conventional method.

When, at step S21, at least one of the two absolute values is larger than the predetermined threshold K, the procedure proceeds to step S25. At step S25, a process similar to that at step S22 is executed, and when the two absolute values are less than the predetermined threshold K, the procedure proceeds to step S26 where the differential coefficient $t_0$ in Class 2 is calculated. In contrast, when at least one of the two absolute values is greater than K, the procedure proceeds to step S24 where the differential coefficient $t_0$ is calculated as in the conventional method.

Here, the calculations at steps S23, S24 and S25 are performed in terms of $12t_0$ itself to simplify further calculations, i.e., the value of $12t_0$ is used in the interpolation calculations below.

Once the differential coefficients $t_0$ and $t_1$ at the sampled points $D_0$ and $D_1$ are obtained, an interpolation curve between the sampled points $D_0$ and $D_1$ is calculated as follows by using the cubic curve passing through the sampled points $D_0$ and $D_1$ and having the differential coefficients $t_0$ and $t_1$ at these sampled points.

Further, while at steps S21, S22 and S25 shown in FIG. 8, only one threshold K is used, two threshold values can be used, so that the steady condition is defined as a portion of the sampled data in which the rates of change are smaller than a first predetermined threshold and that the suddenly changing condition is defined as a portion of the sampled data in which at least one of the rates of change is larger than a second predetermined threshold.

Returning to FIG. 7, at step S3, the values $C_1$, $C_2$ and $C_3$ in equation (11) are calculated from the values $12t_0$ and $12t_1$ obtained at steps S1 and S2, and from the sampled data $y_0$ and $y_1$ of the first and second sampled points $D_0$ and $D_1$.

At step S4, the sampled data $y_0$ at the first sampled point is stored in the display memory 4.

At the next step S5, the pointer of the display memory 4 is incremented.

At step S6, the CPU 3 calculates first interpolation data by substituting 1 for k in equation (10), and then the interpolation data is stored in the display memory 4 at step S7. Subsequently, the pointer of the display memory 4 is incremented at step S8.

At step S9, the CPU 3 judges if all interpolation data in the section between the two adjacent sampled points $D_0$ and $D_1$ have been generated. If all the interpolation data has not been generated yet in the section, the CPU 3 returns to step S6 to calculate the next interpolation data by incrementing the value of k. In this example, the procedure from step S6 to step S9 is repeated 49 times. When 49 interpolation data have been written into the display memory 4, the CPU 3 proceeds to step S10 at which time the value $12t_1$ is transferred into the location where the value $12t_0$ had been stored, so that the sampled point $D_1$ becomes the new sampled point $D_0$. Subsequently, at step S11, the CPU 3 increments the pointer of the display memory 4.

At step S12, the CPU 3 judges if the interpolation data are generated over the entire area to be displayed. If the result is negative, the CPU 3 returns to step S2 to generate the interpolation data in the next section between adjacent sampled points, and to store the interpolation data in the display memory 4.

When all the interpolation data are generated over all the sections to be displayed in the course of the procedure, and the data have been written into the display memory 4, the result of the judgement at step S12 becomes positive, thereby terminating the processing.

Thereafter, the sampled and interpolation data stored in the display memory 4 are supplied as an output signal to the display 6 via the D/A converter 5.

Figure 1:
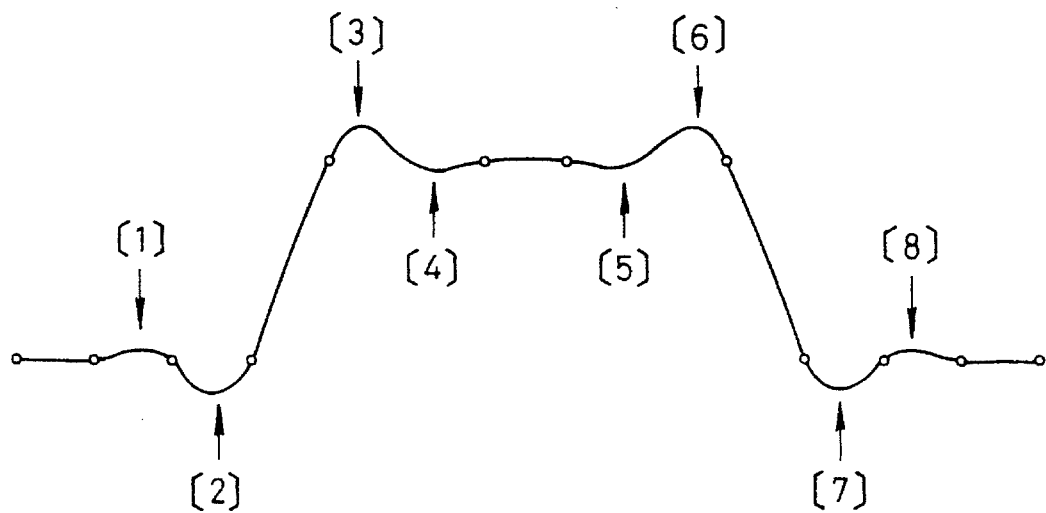
FIG. 1 is a waveform chart illustrating an example of a waveform reproduced by a conventional apparatus when an input signal is a pulse.
Figure 9:
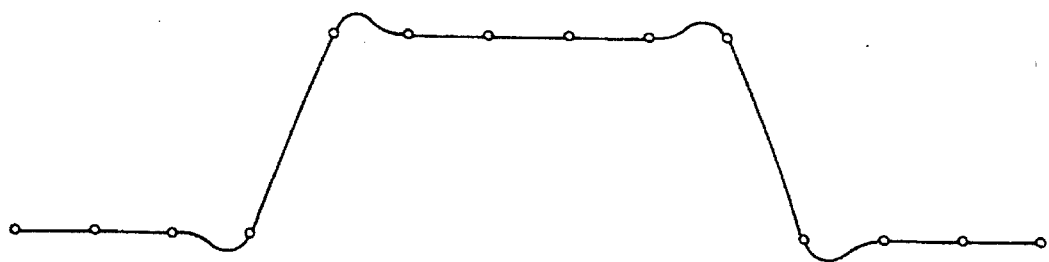
FIG. 9 is a waveform chart illustrating an example of a waveform of a reproduced, or output signal when the input signal in the embodiment shown in FIG. 6 is a pulse.

FIG. 9 illustrates an example of a waveform of a reproduced, or output, signal when the input signal is a pulse-shaped electric signal. Comparing the waveform with the conventional one shown in FIG. 1, it is found that the "undulations" of the reproduced output signal, which occurred in steady positions of the conventional output signal in response to the portions before and after the step-like transitions in the input signal, were greatly reduced in the present invention, even if the input signal includes step-like transitions.

Although a specific embodiment of an apparatus and method for interpolating sampled signals constructed in accordance with the present invention has been disclosed, it is not intended that the invention be restricted to either the specific configurations or the method disclosed herein. Modifications may be made in a manner obvious to those skilled in the art.

For example, although the algorithm of the embodiment changes the selection manner of sampled points for determining the differential coefficients depending on the pattern of a line connecting the sampled points, other algorithms can be used as long as the algorithm satisfies such a condition that the differential coefficients at the sampled points in a steady condition become closer to the rate of change in the steady condition than those calculated by the conventional method, when the line pattern includes such a transition that alters from the suddenly changing condition to the steady condition or vice versa. Accordingly, it is intended that the invention be limited only by the scope of the appended claims.

What is claimed is:

1. An apparatus for interpolating sampled signals, comprising:

means for receiving an input signal;

means for sampling the input signal at sampled points to obtain corresponding sampled data representative of said input signal;

means for interpolating between said sampled data obtained from said sampling means to output interpolation data, said means for interpolation including:

i) means for detecting the rate of change of sampled data between each adjacent pair of sampled points;

ii) means for classifying each of selected ones of said sampled points into a plurality of predetermined classes according to the transition behavior of said sampled data before and after said selected sampled points, said transition behavior including: (1) a transition from a steady condition to a suddenly changing condition, or (2) a transition from the suddenly changing condition to the steady condition, or (3) a behavior other than (1) or (2), said steady condition being defined as a portion of said sampled data in which said rates of change are smaller than a first predetermined threshold, and said suddenly changing condition being defined as a portion of said sampled data in which at least one of said rates of change is larger than a second predetermined threshold;

iii) means for calculating differential coefficients at a pair of sampled points in accordance with predetermined equations each of which is associated with one of said plurality of predetermined classes to which said pair of sampled points belongs;

iv) means for determining an interpolation curve between said pair of sampled points as a function of said sampled data at said pair of sampled points and said differential coefficients at said pair of sampled points; and v) means for generating interpolation data as display data between said pair of sampled points in accordance with said interpolation curve; and means for storing the display data.

2. The apparatus as claimed in claim 1, wherein said means for detecting the rate of change of said sampled data includes means for forming a line pattern by connecting pairs of adjacent sampled points and for calculating the slope of said line pattern between said pair of adjacent sampled points to obtain said rates of change.

3. The apparatus as claimed in claim 2, wherein said means for classifying judges, in a predetermined range whose center is at a position of a sampled point at which a differential coefficient is to be determined, whether the steady condition appears before or after said sampled point, and whether the suddenly changing portion appears before or after said sampled point, and allots to said sampled point for said line pattern a first class where the steady condition appears before the sampled point and the suddenly changing condition appears after the sampled point, and a second class where the suddenly changing condition appears before the sampled point and the steady condition appears after the sampled point.

4. The apparatus as claimed in claim 3, wherein said means for calculating differential coefficients selects, in said predetermined range, a number of sampled points in the suddenly changing condition smaller than those in the steady condition.

5. The apparatus as claimed in claim 4, wherein said means for calculating differential coefficients determines said differential coefficient on the basis of a continuous curve passing a sampled point at which said differential coefficient is to be determined, and the selected number of sampled points on either side of said sampled point.

6. The apparatus as claimed in claim 5, wherein when a sampled point at which the differential coefficient is to be calculated belongs to said first or second class, said means for calculating differential coefficients determines said differential coefficient for that sampled point as that of a cubic curve passing two other sampled points in said steady condition, one other sampled point in said suddenly changing condition and said sampled point.

7. The apparatus as claimed in claim 6, wherein said predetermined equations are expressed as $$t_0 = \frac{y_{-2} + 6y_{-1} + 3y_0 + 2y_1}{6}$$

for the first class, and $$t_0 = \frac{-2y_{-1} - 3y_0 + 6y_1 - y_2}{6}$$

for the second class, where $t_0$ is the differential coefficient at the sampled point whose sampled data is $y_0$, $y_{-2}$ and $y_{-1}$ are sampled data at sampled points before the sampled point at which said differential coefficient is to be calculated, and $y_1$ and $y_2$ are sampled data at sampled points after said sampled point at which said differential coefficient is to be calculated.

8. The apparatus as claimed in claim 1, wherein said predetermined equations give smaller weight to the sampled data of sampled points in the suddenly changing condition than to the sampled data of sampled points in the steady condition.

9. The apparatus as claimed in claim 1, wherein said first predetermined threshold is equal to said second predetermined threshold.

10. A method for generating an interpolated output signal, comprising the steps of:

(a) receiving an input signal and storing sampled data obtained by sampling said input signal at sampled points;

(b) selecting a first sampled point at which a differential coefficient is to be calculated;

(c) selecting a first predetermined number of second sampled points before said first sampled point and a second predetermined number of third sampled points after said first sampled point;

(d) calculating for said first, second and third sampled points rates of change between two adjacent ones of said sampled points;

(e) determining whether there is a difference of at least a predetermined value among said rates of change in accordance with the result of the determination;

(f) determining the differential coefficient at the first sampled point by performing a weighting operation on the selected rates of changes in accordance with said pattern of rates of changes;

(g) selecting one of the two sampled points adjacent to said first sampled point as a fourth sampled point and repeating steps (b)–(f) with regard to said fourth sampled point;

(h) determining an interpolation curve for interpolating between said first and fourth sampled points in accordance with the sampled data at said first and fourth sampled points and the differential coefficients at said first and fourth sampled points;

(i) generating interpolation data for interpolating a portion between said first and fourth sampled points according to said interpolation curve; and (j) generating an interpolated output signal in response to said interpolated data.

11. The method as claimed in claim 10 including the step of selecting said first and second predetermined number of sampled points according to the pattern of rates of change before and after said first sampled point.

12. An apparatus for generating an interpolated signal from a received analog signal comprising:

an analog-to-digital converter;

a first memory connected to the analog-to-digital converter to receive and store a digital signal;

means connected to the first memory for sampling the digital signal at sampled points to obtain corresponding sampled data representative of the received analog signal;

means for interpolating between the sampled data obtained from the sampling means to output interpolation data, the means for interpolation including:

i) means for detecting the rate of change of sampled data between each adjacent pair of sampled points;

ii) means for classifying each of selected ones of the sampled points into a plurality of predetermined classes according to the transition behavior of the sampled data before and after the selected sampled points, the transition behavior including: (1) a transition from a steady condition to a suddenly changing condition, or (2) a transition from the suddenly changing condition to the steady condition, or (3) a behavior other than (1) or (2), the steady condition being defined as a portion of the sampled data in which the rates of change are smaller than a first predetermined threshold, and the suddenly changing condition being defined as a portion of the sampled data in which at least one of the rates of change is larger than a second predetermined threshold;

iii) means for calculating differential coefficients at a pair of sampled points in accordance with predetermined equations each of which is associated with one of the plurality of predetermined classes to which the pair of sampled points belongs;

iv) means for determining an interpolation curve between the pair of sampled points as a function of the sampled data at the pair of sampled points and the differential coefficients at the pair of sampled points; and v) means for generating interpolation data as display data between the pair of sampled points in accordance with the interpolation curve;

a second memory connected to the interpolation means to receive and store the display data; and a digital-to-analog converter connected to the second memory.

13. An apparatus for generating an interpolated signal from a received analog signal comprising:

an analog-to-digital converter;

a first memory connected to the analog-to-digital converter to receive and store a digital signal;

a programmable central processing unit;

a second memory connected to the programmable central processing unit;

a digital-to-analog converter connected to the second memory; and a display unit, wherein the programmable central processing unit responds to stored instructions that cause the central processing unit to:

i) sample the digital signal at sampled points to obtain corresponding sampled data representative of the received analog signal;

ii) interpolate between the sampled data obtained from the sampling means to output interpolation data, wherein the interpolating includes the steps of:

a) detect the rate of change of sampled data between each adjacent pair of sampled points;

b) classify each of selected ones of the sampled points into a plurality of predetermined classes according to the transition behavior of the sampled data before and after the selected sampled points, the transition behavior including: (1) a transition from a steady condition to a suddenly changing condition, or (2) a transition from the suddenly changing condition to the steady condition, or (3) a behavior other than (1) or (2), the steady condition being defined as a portion of the sampled data in which the rates of change are smaller than a first predetermined threshold, and the suddenly changing condition being defined as a portion of the sampled data in which at least one of the rates of change is larger than a second predetermined threshold;

c) calculate differential coefficients at a pair of sampled points in accordance with predetermined equations each of which is associated with one of the plurality of predetermined classes to which the pair of sampled points belongs;

d) determine an interpolation curve between the pair of sampled points as a function of the sampled data at the pair of sampled points and the differential coefficients at the pair of sampled points; and e) generate interpolation data as display data between the pair of sampled points in accordance with the interpolation curve.

* * * * *